(12) United States Patent
Fujine et al.

(10) Patent No.: US 8,964,124 B2
(45) Date of Patent: Feb. 24, 2015

(54) VIDEO DISPLAY DEVICE THAT STRETCHES A VIDEO SIGNAL AND A SIGNAL OF THE LIGHT SOURCE AND TELEVISION RECEIVING DEVICE

(75) Inventors: Toshiyuki Fujine, Osaka (JP); Tomoharu Noutoshi, Osaka (JP); Yoji Shiraya, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/357,231

(22) PCT Filed: Jun. 27, 2012

(86) PCT No.: PCT/JP2012/066407
§ 371 (c)(1),
(2), (4) Date: May 9, 2014

(87) PCT Pub. No.: WO2013/069332
PCT Pub. Date: May 16, 2013

(65) Prior Publication Data
US 2014/0300819 A1    Oct. 9, 2014

(30) Foreign Application Priority Data

Nov. 11, 2011    (JP) .................................. 2011-247324

(51) Int. Cl.
*H04N 9/69*    (2006.01)
*H04N 5/52*    (2006.01)
*H04N 5/57*    (2006.01)
(Continued)

(52) U.S. Cl.
CPC .................. *G09G 3/34* (2013.01); *H04N 5/202* (2013.01); *G09G 3/3406* (2013.01); *G09G 2320/0646* (2013.01); *G09G 2360/16* (2013.01)
USPC ............ 348/687; 348/675; 348/678; 345/102

(58) Field of Classification Search
USPC ............ 348/687, 675, 790, 678, 673; 345/82, 345/63, 77, 102, 589, 690; 315/169.1–169.3
See application file for complete search history.

(56) References Cited

U.S. PATENT DOCUMENTS

2006/0268180 A1*  11/2006  Chou ........................... 348/673
2007/0152926 A1    7/2007  Kwon (Continued)

FOREIGN PATENT DOCUMENTS

JP    9-80378 A     3/1997
JP    2007-183608 A  7/2007

(Continued)

*Primary Examiner* — Victor Kostak
(74) *Attorney, Agent, or Firm* — Birch, Stewart, Kolasch & Birch, LLP

(57) ABSTRACT

A video display device increases a feeling of brightness and expresses a video with high contrast by detecting a part of a video signal that emits light, enhancing the display luminance of the light-emitting part, and displaying the part. A light emission detection portion (1) uses a prescribed feature quantity related to the brightness of an input video signal, predetermines the light emission quantity for the video signal on the basis of the relationship with the feature quantity, and detects the light emission quantity for each input video signal frame from the feature quantity. A backlight luminance stretch portion (3) stretches the light source luminance of the backlight according to the light emission quantity detected. A video signal luminance stretch portion (6) stretches the video signal according to the light emission quantity or the luminance distribution of the input video signal.

7 Claims, 12 Drawing Sheets

(51) Int. Cl.
*G09G 3/06* (2006.01)
*G09G 3/34* (2006.01)
*H04N 5/202* (2006.01)

(56) References Cited

U.S. PATENT DOCUMENTS

| | | | |
|---|---|---|---|
| 2008/0239158 A1* | 10/2008 | Wu et al. | 348/677 |
| 2008/0272999 A1* | 11/2008 | Kurokawa et al. | 345/89 |
| 2008/0316167 A1* | 12/2008 | Kurokawa et al. | 345/102 |
| 2009/0066632 A1* | 3/2009 | Chen | 345/102 |
| 2009/0122087 A1* | 5/2009 | Maruyama et al. | 345/690 |
| 2009/0274389 A1* | 11/2009 | Yamamoto | 382/274 |
| 2010/0053222 A1* | 3/2010 | Kerofsky | 345/690 |
| 2010/0225574 A1* | 9/2010 | Fujiwara et al. | 345/102 |
| 2010/0302269 A1* | 12/2010 | Morimoto | 345/589 |
| 2010/0328535 A1* | 12/2010 | Okui et al. | 348/578 |
| 2011/0164050 A1* | 7/2011 | Adachi | 345/589 |

FOREIGN PATENT DOCUMENTS

| | | |
|---|---|---|
| JP | 2008-99207 A | 4/2008 |
| JP | 2009-63694 A | 3/2009 |

* cited by examiner

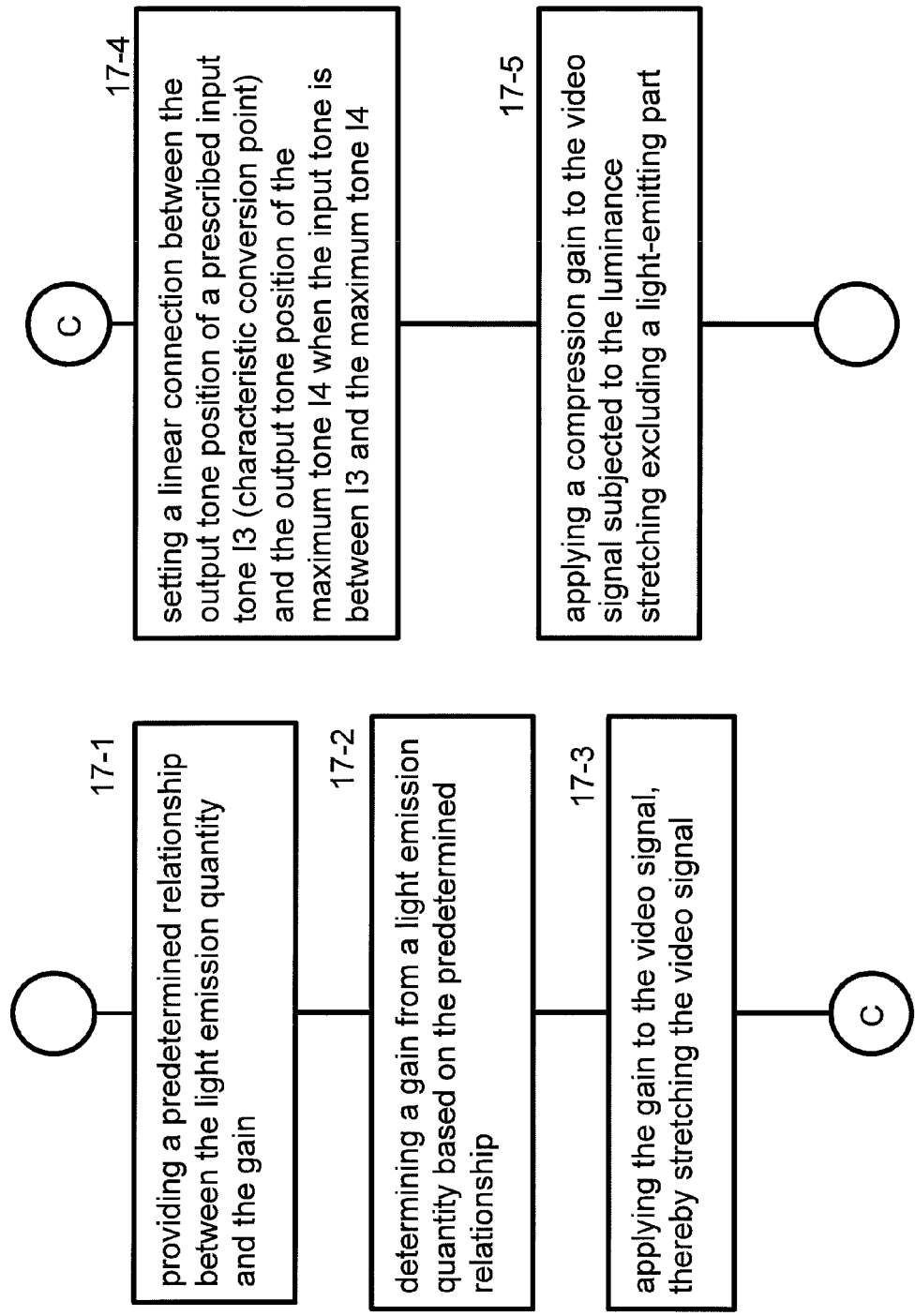

US 8,964,124 B2

VIDEO DISPLAY DEVICE THAT STRETCHES A VIDEO SIGNAL AND A SIGNAL OF THE LIGHT SOURCE AND TELEVISION RECEIVING DEVICE

TECHNICAL FIELD

The present invention relates to a video display device and a television receiver, and more particularly to a video display device and a television receiver provided with an enhancement function for improving image quality of a display video.

BACKGROUND OF THE INVENTION

An enhancement function for improving image quality of a display video in a video display device has been known. With the enhancement function, stretch processing for expanding distribution of intensity of an input video signal is performed. For example, in the case of executing the enhancement function, typically, a maximum value of a tone is detected for each frame of a video signal and a gain is applied to a part of the video signal with a high tone for expanding when the maximum value has a low level. Further, a minimum value of the tone of the video signal is detected and a compression gain is applied to a part of the video signal with a low tone for reducing when the minimum value is high. Using such the enhancement function allows a signal range of the video signal to be wider so that a contrast feeling of a display image is increased, resulting in improvement in image quality.

For example, Patent Literature 1 discloses a liquid crystal display device for automatically adjusting contrast, along with adjustment of luminance of a backlight, so that contrasting of an image closes to that before the adjustment. The liquid crystal display device is configured to change luminance of an image by turning on/off a light source of a backlight device by an operator so as to allow electricity to be effectively saved, and since an enhancement function works according to the changed luminance to adjust a display image with contrast corresponding to the changed luminance, attain almost the same level of contrast in an image as that before lowering luminance even in the case of lowering luminance of the backlight device.

PRIOR ART DOCUMENT

Patent Documents

Patent Document 1: Japanese Laid-Open Patent Publication No. 9-80378

SUMMARY OF THE INVENTION

Problem to be Solved by the Invention

In the case of enhancing display luminance, a bright and brilliant light emitting part on a screen is specified to enhance display luminance of the light emitting part, thereby improving contrast feeling perceived by the human eye, so that a high-definition display video with increased feeling of brightness can be provided.

Processing with a conventional enhancement function is performed that, according to a maximum value or a minimum value in pixel values of a video signal, each of which is high has a tone expanded to be raised while each of which is low has a tone compressed to be lowered. However, since a standardized video signal does not represent luminance actually perceived bright by the human eye, it is difficult to specify a light emitting part only from a tone value. That is, even in the case of evenly enhancing various videos according to a maximum value or a minimum value of pixel values, a high-quality video with high contrast is not necessarily obtained at all times.

The present invention has a benefit that, in widely variable videos, a relatively bright light emitting part is detected from distributed luminance of a video to consciously enhance the light emitting part so that the light emitting part is further emphasized on a screen to improve image quality, however, a conventional technique has not included enhancement function processing performed based on such an idea.

The present invention has been devised in light of the above-described problem, and an object of the present invention is to provide a video display device and a television receiver for detecting a light emitting part of a video signal to enhance display luminance of the light emitting part for emphasized display, thereby representing a video with high contrast having further increased feeling of brightness so as to improve video quality.

Means for Solving the Problem

To solve the above problems, a first technical means of the present invention is a video display device comprising: a display portion for displaying an input video signal; a light source for illuminating the display portion; and a control portion for controlling the display portion and the light source, wherein the control portion stretches luminance of the light source based on a prescribed feature quantity associated with lightness of the input video signal as well as detects a light-emitting part of the input video signal based on the feature quantity or other feature quantity, and stretches a video signal of the light-emitting part to display on the display portion.

A second technical means is the video display device of the first technical means, wherein the feature quantity is a luminance value of the input video signal, and the control portion detects, the light-emitting part which is predetermined according to the histogram, based on a luminance histogram for each frame of the input video signal, and as to the input video signal of a prescribed range including the detected light-emitting part, detects a predetermined light emission quantity according to a score obtained by counting the number of pixels with a weight given to luminance for each pixel to stretch the luminance of the light source according to the detected light emission quantity.

A third technical means is the video display device of the second technical means, wherein when an average value of the luminance histogram is A and a standard deviation is σ, the control portion regards a pixel which is greater than or equal to: thresh=A+Nσ (N is a constant) as the light-emitting part.

A fourth technical means is the video display device of the first technical means, wherein the feature quantity is a maximum value of tone values of RGB for each pixel of the input video signal, and the control portion detects a predetermined light emission quantity according to a value obtained by averaging the maximum values of tone values of the RGB of the input video signal and stretches the luminance of the light source according to the detected light emission quantity.

A fifth technical means is the video display device of the second technical means, wherein the control portion performs video processing for converting and outputting an input tone of the input video signal, and the video processing includes processing for, based on the luminance histogram for each frame of the input video signal, detecting the predetermined light-emitting part according to the histogram, setting a prescribed characteristic conversion point in an area of the detected light-emitting part, applying a gain to a video signal with a lower tone than the characteristic conversion point so that the input tone of the input video signal at the characteristic conversion point is stretched up to a prescribed output tone, and in the input tone which is greater than or equal to the characteristic conversion point, setting the output tone for the input tone so as to connect the output tone after application of gain at the characteristic conversion point and a maximum output tone.

A sixth technical means is the video display device of the second technical means, wherein the control portion performs video processing for converting and outputting an input tone of the input video signal, and the video processing includes processing for defining a relationship between a gain applied to a video signal and the light emission quantity in advance, determining the gain according to the light emission quantity detected from the input video signal, applying the determined gain to the input video signal for stretching, using an input tone at a point where an output tone after the application of gain is stretched up to a prescribed output tone as a characteristic conversion point, outputting the video signal with the output tone to which the gain is applied in a lower tone than the characteristic conversion point, and in the input tone which is greater than or equal to the characteristic conversion point, setting the output tone for the input tone so as to connect the output tone after application of gain at the characteristic conversion point and a maximum output tone.

A seventh technical means is the video display device of the fifth technical means, wherein the video processing includes processing for reducing the output tone by applying a compression gain in a prescribed area of a non-light-emitting part excluding the light-emitting part after applying a prescribed gain to the input video signal to stretch the video signal.

An eighth technical means is the video display device of the seventh technical means, wherein the compression gain is a value for reducing display luminance which is increased by stretching of the luminance of the light source and stretching of the video signal by application of the gain in the prescribed area of the non-light-emitting part.

A ninth technical means is a television receiving device including the video display device of the first technical means.

Effect of the Invention

According to the video display device of the present invention, it is possible to provide a video display device and a television receiving device that further increase a feeling of brightness and expresses a video with high contrast by detecting a part of a video signal that emits light and enhancing display luminance of the light-emitting part, and improve video quality by displaying the part in an emphasized manner to thereby.

BRIEF DESCRIPTION OF DRAWINGS

FIG. 17 is a flowchart explaining another example of the luminance stretch processing of the input video signal according to the present invention.

PREFERRED EMBODIMENT OF THE INVENTION

Embodiment 1

Figure 1:
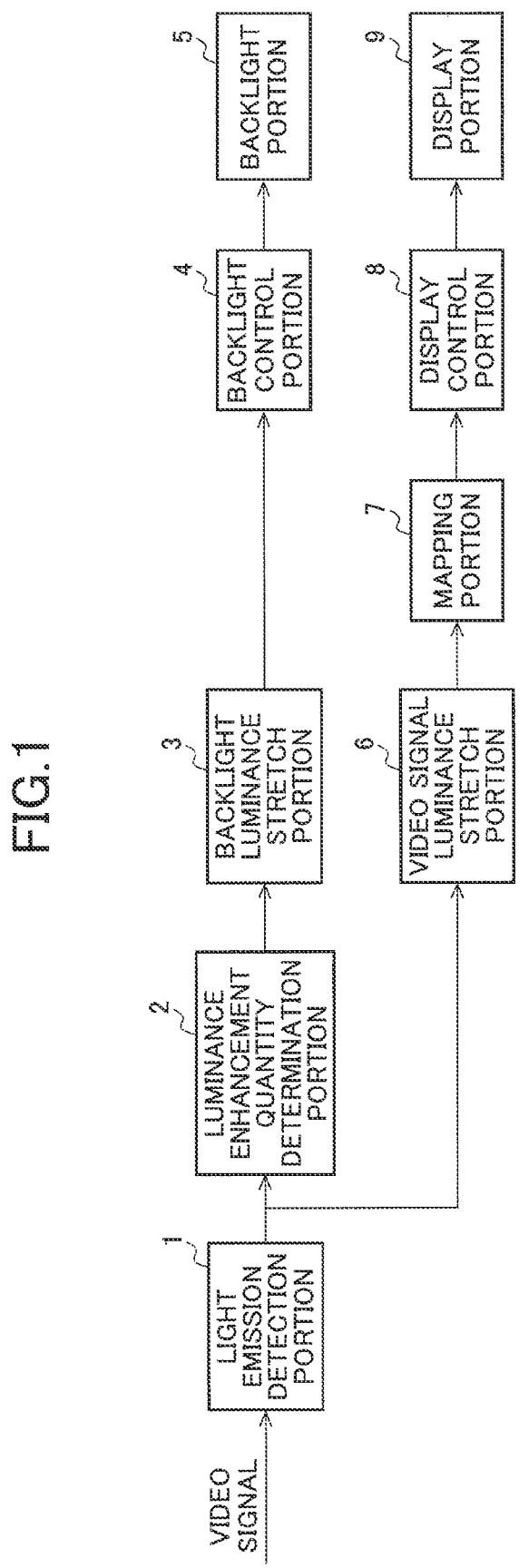
FIG. 1 is a diagram explaining an embodiment of a video display device according to the present invention, showing a configuration of a main part of the video display device.

FIG. 1 is a diagram explaining an embodiment of a video display device according to the present invention, showing a configuration of a main part of the video display device. The video display device is configured to display a video by performing image processing for an input video signal, and is applicable to a television receiving device and the like.

A video signal separated from a broadcast signal or a video signal input from an external device is input to a light emission detection portion 1. In the light emission detection portion 1, using a prescribed feature quantity associated with lightness of an input video signal, a light emission quantity for the video signal is predetermined on the basis of a relationship with the above-described feature quantity. Further, the light emission quantity is detected from the feature quantity for each frame of the input video signal.

For example, using luminance of a video signal as the feature quantity, a Y histogram obtained by integrating the number of pixels for each tone of a luminance signal Y is generated for each frame of the input video signal to detect a light-emitting part from the Y histogram. The light-emitting part is obtained by an average value and a standard deviation of the Y histogram, and is detected as a relative value for each Y histogram.

Moreover, the light emission quantity is detected for each frame thereof by integrating the number of pixels with a larger weight given as the luminance becomes higher as to the feature quantity (luminance) of the light-emitting part. The light emission quantity shows a degree of light emission of the input video signal and serves as an index for performing luminance stretching of backlight and luminance stretching of the video signal afterward.

In another example of detection of light emission by the light emission detection portion 1, a maximum tone value among tone values of video signals of RGB constituting one pixel (referred to as Max RGB) is extracted, an average value of the tone values extracted from all pixels in one frame (referred to as Max RGB Ave) is calculated, and this value is used as the feature quantity. The Max RGB Ave of each pixel is usable as the feature quantity associated with lightness of a video. Further, a relationship between the above-described Max RGB Ave and the light emission quantity showing a degree of light emission of the video signal is defined in advance. For example, an area where the Max RGB Ave is high to some extent is regarded as emitting light so that the light emission quantity is defined to be high. Then, the light emission quantity at the time is obtained from the above-described Max RGB Ave for each frame of the input video.

A luminance enhancement quantity determination portion 2 determines a luminance enhancement quantity used for performing luminance enhancement of the backlight based on the light emission quantity of the input video signal detected by the light emission detection portion 1. Here, a relationship between the luminance enhancement quantity and the light emission quantity is defined in advance, and the luminance enhancement quantity is determined based on the light emission quantity output from the light emission detection portion 1 in the luminance enhancement quantity determination portion 2. For example, an area where the light emission quantity is high to some extent is defined so that the luminance enhancement quantity also becomes large. Thereby, in an image with a large light emission quantity, the luminance enhancement quantity becomes higher.

A backlight luminance stretch portion 3 stretches backlight luminance based on the luminance enhancement quantity determined by the luminance enhancement quantity determination portion 2 to increase the luminance of a light source (for example, LED) of a backlight portion 5. The luminance of the LED of the backlight portion 5 is subjected to PWM (Pulse Width Modulation) control, and is able to be subjected to current control or a combination thereof to be controlled so as to have a desired value.

On the other hand, a video signal stretch portion 6 increases a gain of the input video signal to stretch the luminance of the video signal. In this case, it is possible to stretch the video signal by prescribed gain-up with respect to the light-emitting part obtained from the average value and the standard deviation of the luminance histogram described above, or to determine the gain with the light emission quantity calculated from the luminance histogram and the Max RGB Ave to stretch the video signal.

A mapping portion 7 generates tone mapping of input/output characteristic (response characteristic of an output tone for an input tone) of the video signal. In this case, when the gain determined by the video signal luminance stretch portion 6 is applied as it is to perform tone mapping of the input/output characteristic, an area excluding the light-emitting part of the video signal is also stretched to increase the screen luminance. Therefore, in a non-light-emitting part on the low tone side, tone mapping is performed with the output tone for the input tone reduced. Thereby, in the input/output characteristic of tone mapping, an area where the video signal is stretched mainly becomes a bright area with a high tone and control is performed to make the bright area much brighter by video signal processing.

The mapping portion 7 outputs control data for controlling a display portion 9 to a display control portion 8, and the display control portion 8 controls display on the display portion 9 based on the data. For the display portion 9, a liquid crystal panel that displays an image by illumination with the LED of the backlight portion 5 is used.

With the above-described configuration, since the luminance stretch quantity of the backlight portion 5 is determined based on the light emission quantity detected by the light emission detection portion 1, it is possible to perform control to brighten the bright video with large light emission quantity much brighter. Moreover, gain-up of the video signal by video signal processing is performed according to a light-emitting area of the Y histogram and the detected light emission quantity, and further, the luminance is reduced for a part regarded as not emitting light excluding the light-emitting part through tone mapping. This makes it possible to increase the screen luminance for a light-emitting part and express a video with high contrast so that image quality is able to be improved.

As a control example of the backlight portion 5 and the display portion 9, it is possible to adopt a so-called area active control system that divides a video area into multiple areas (areas) to control a light source of the corresponding backlight portion 5 for each of the areas.

In the area active control, a video is divided into prescribed multiple areas (areas) and a maximum tone value of a video signal is extracted for each of the divided areas to determine a lighting rate of an LED for each area according to the extracted maximum tone value. Here, it may not be the maximum tone value for each of the divided areas and may be other statistical value such as an average value for each of the divided areas. Moreover, for example, for a dark area where the maximum tone value is low, the lighting rate is decreased to reduce the luminance of the backlight. Then, electricity powered to the entire backlight is increased according to the luminance enhancement quantity in this state to entirely increase the luminance of the backlight. Thereby, a bright video that emits light is made brighter and a feeling of brightness is increased.

Moreover, in a non-light-emitting part, the luminance corresponding to luminance stretching is reduced by video signal processing, resulting that the luminance only for a light-emitting part becomes high on a screen, so that a high-quality video with high contrast is able to be displayed.

In addition, as a control example of the backlight portion 5 and the display portion 9, the light emission luminance of the entire light source of the backlight portion 5 may be stretched according to the luminance enhancement quantity determined by the luminance enhancement quantity determination portion 2, without applying the area active control system as described above. Thereby, a bright video that emits light is made brighter and a feeling of brightness is increased. Moreover, in a non-light-emitting part, the luminance corresponding to luminance stretching is reduced by video signal processing, resulting that the luminance for a light-emitting part becomes high on a screen, so that a high-quality video with high contrast is able to be displayed.

Note that, a control portion of the present invention is for controlling the backlight portion 5 and the display portion 9, and corresponds to the light emission detection portion 1, the luminance enhancement quantity determination portion 2, the backlight luminance stretch portion 3, the backlight control portion 4, the video signal luminance stretch portion 6, the mapping portion 7, and the display control portion 8.

In the case of constituting the above-described display device as a television receiving device, the television receiving device is provided with means to select a broadcast signal received by an antenna to be demodulated, followed by decoding, for generating a video signal for reproduction, in which prescribed image processing is appropriately applied to the video signal for reproduction to be input as the input video signal of FIG. 1. This makes it possible to display the received broadcast signal on the display portion 9. The present invention is able to be configured as a video display device and a television receiving device provided with the video display device.

Hereinafter, description will be given in more detail for a processing example of each portion of the present embodiment having the above-described configuration.

First, description will be given in more detail for light emission detection processing in the light emission detection portion 1.

As described above, in the light emission detection portion 1, using a prescribed feature quantity associated with lightness of an input video signal, a light emission quantity for the video signal is predetermined on the basis of a relationship with the above-described feature quantity. Further, the light emission quantity is detected from the feature quantity for each frame of the input video signal.

(Light Emission Detection Processing 1)

A first example of light emission detection processing is shown in the flowchart of F*ig*. 13. In the first example of light emission detection processing, using luminance of a video signal as the feature quantity, in Step 13-1, a luminance histogram obtained by integrating the number of pixels according to a luminance level is generated for each frame of the input video signal to detect a light-emitting part for each frame from the histogram.

Figure 2:
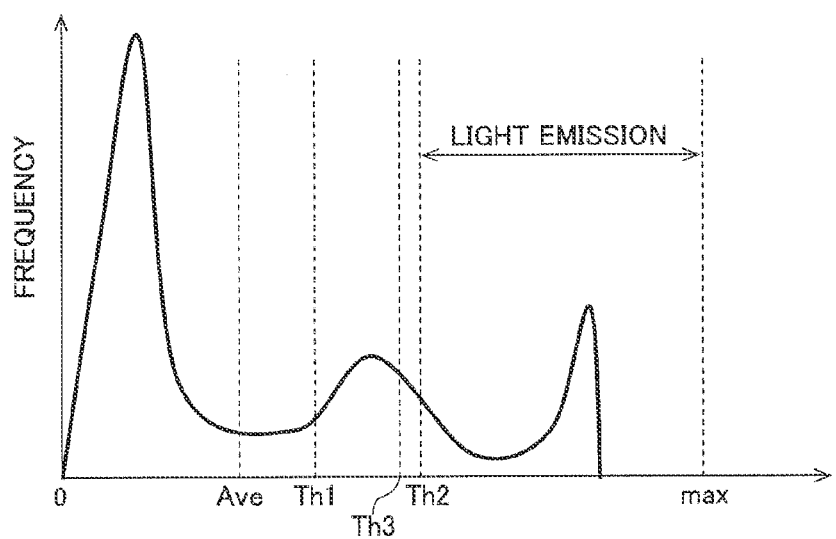
FIG. 2 shows an example of a luminance histogram generated from a luminance signal Y of an input video signal.

FIG. 2 shows an example of a luminance histogram generated from a luminance signal Y of an input video signal. The light emission detection portion 1 integrates the number of pixels for each luminance tone to generate a Y histogram for each frame of the input video signal. A horizontal axis indicates a tone value of luminance Y, and a max value has a tone level of 255, for example, in the case of a video signal of 8-bit representation. A vertical axis indicates the number of pixels integrated for each tone value (frequency). When the Y histogram is generated, in Step 13-2, an average value (Ave) and a standard deviation ($\sigma$) are calculated from the Y histogram, which are used for calculating two thresholds Th.

A second threshold Th2 is for defining a light emitting boundary. In the Y histogram, in Step 13-3 processing is performed for detecting pixels which are greater than or equal to the threshold Th2 as being a light-emitting part.

The second threshold Th2 is provided by:

$$Th2 = Ave + N\sigma \qquad \text{expression (1)}$$

N is given as a prescribed constant.

Additionally, a first threshold Th1 is set so as to suppress incongruity in tones of areas which are smaller than Th2 and the like, and provided by:

$$Th1 = Ave + M\sigma \qquad \text{expression (2)}$$

M is given as a prescribed constant, and M<N.

Further, in the present example, in step 13-4, a third threshold Th3 is further set. The third threshold Th3 is placed between Th1 and Th2, and is provided for detecting a light emission quantity. The light emission quantity is for defining a degree of light emission of the light-emitting part as an index, and is predetermined on the basis of a relationship with the feature quantity. In the present example, the light emission quantity is calculated as a score by calculation shown below.

The threshold Th3 may have the same value as Th2, but is provided having a large margin for a light-emitting part whose value is greater than or equal to Th2 in order to easily perform processing. Therefore, Th3 is given as, $$Th3 = Ave + Q\sigma \ (M < Q \leq N) \qquad \text{expression (3)}$$

In Step 13-5, the score (light emission quantity) shows a degree of lightness by counting the number of pixels of pixels with a tone value which is greater than or equal to the third threshold Th3 to calculate a weighted distance from the threshold Th3, and, in Step 13-6, is calculated, for example, by:

$$\text{Score} = 1000 \times \Sigma \text{count}[i] \times (i^2 - Th3^2)/(\Sigma \text{count}[i] \times Th3^2) \qquad \text{expression (4)}$$

$\Sigma$count[i] is obtained by counting the number of pixels for each tone value i for integration. Therefore, when there are a lot of high tone pixels away from Th3 in a light-emitting part, the score becomes high. Furthermore, even when the number of pixels which are greater than or equal to Th3 is fixed, the score becomes higher when there are a lot of high tone pixels.

(Light Emission Detection Processing 2)

Figure 3:
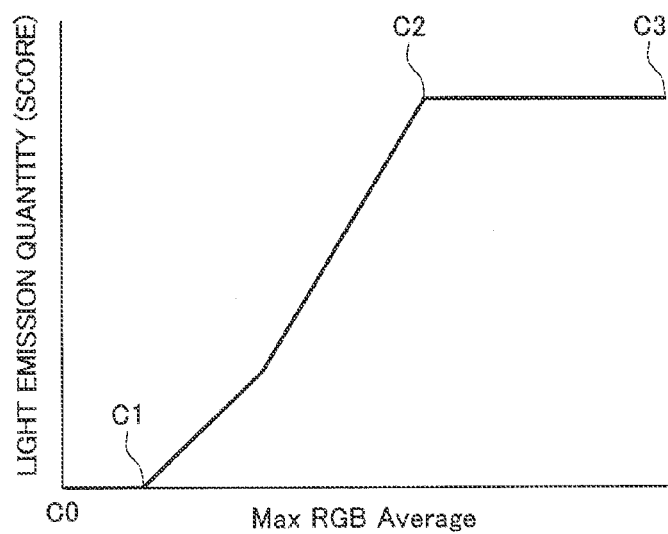
FIG. 3 is a diagram explaining another example of detecting a light emission quantity from a feature quantity.

Another example of light emission detection is shown in the flowchart of F*ig*. 14. FIG. 3 is a diagram explaining the another example of detecting a light emission quantity from a feature quantity. In the present example, in Step 14-1, used as the feature quantity of an input video signal is a value obtained by averaging maximum tone values (Max RGB) among tone values of video signals of RGB constituting one pixel in all pixels in a frame (Max RGB Average (Max RGB Ave)).

Further, as shown in FIG. 3, a relationship between the detected Max RGB Ave and the light emission quantity (score) is predetermined, and in Step 14-2, the predetermined relationship of F*ig*. 3 is provided. In this example, in an area from C0 where Max RGB Ave is minimum to an intermediate point C1, the light emission quantity (score) is 0. That is, this area is regarded as not emitting light. Moreover, in an area C1 to C2 (C1<C2), the light emission quantity is also increased according to an increase in Max RGB Ave. The light emission quantity becomes fixed at a maximum level from C2 to C3 (maximum value of Max RGB Ave).

In the light emission detection portion 1, in Step 14-3, the light emission quantity (score) according to the detected Max RGB Ave is determined in accordance with the predetermined relationship as shown in FIG. 3.

Figure 4:
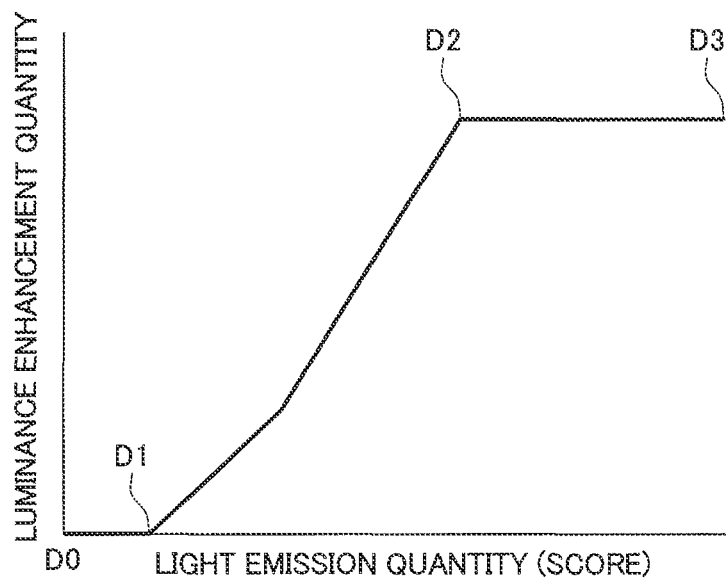
FIG. 4 is a diagram showing a setting example of a luminance enhancement quantity according to a light emission quantity detected by a light emission detection portion.

An example of luminance stretch processing of the backlight is shown in the flowchart of F*ig*. 15. FIG. 4 is a diagram showing a setting example of a luminance enhancement quantity according to a light emission quantity detected by the light emission detection portion. In the luminance enhancement quantity determination portion 2, in Step 15-1, a luminance enhancement quantity used for luminance stretching of the backlight is calculated in accordance with the light emission quantity (score) detected by the light emission detection portion 1. The luminance enhancement quantity is set as a quantity showing the maximum luminance that is desired to be displayed, and is able to be shown with a value of screen luminance (cd/m$^2$) and a magnification of luminance stretching and the like, for example. The maximum luminance that is desired to be displayed is the screen luminance, for example, when a video signal has the maximum tone (tone level of 255 in the case of 8-bit representation).

In the example of FIG. 4, while the light emission quantity is at a fixed level or higher (D2 to D3 (maximum value of light emission quantity)), the luminance enhancement quantity is set to be fixed at a high level to increase a feeling of brightness by stretching a brilliant high-tone video so as to have higher luminance. In this example, in a part where the score is at a fixed level or higher, possible maximum screen luminance reached after luminance stretching is set to 1500 (cd/m$^2$), for example. Moreover, an area where the light emission quantity is lower than D2 (D1 (D1<D2) to D2) is set so that the luminance stretch quantity becomes smaller as the light emission quantity becomes smaller. In an area where the light emission quantity is minimum (D0 (light emission quantity=0) to D1), luminance enhancement is not performed. This is because the light emission quantity is small so that there is less light-emitting part and little effect is given even when luminance enhancement is performed. The maximum screen luminance in this case is set to, for example, 450 cd/m$^2$.

(Luminance Stretch Processing of Backlight)

Figure 5:
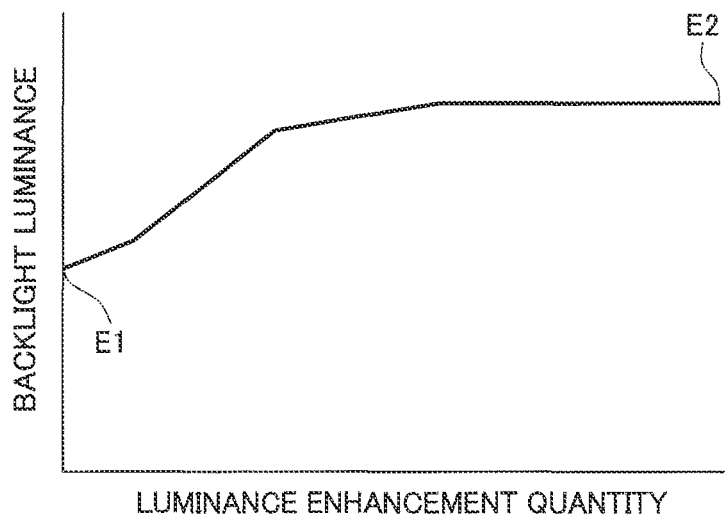
FIG. 5 is a diagram showing a control example of backlight luminance according to a luminance enhancement quantity determined by a luminance enhancement quantity determination portion.

FIG. 5 is a diagram showing a control example of backlight luminance according to a luminance enhancement quantity determined by the luminance enhancement quantity determination portion.

In the backlight luminance stretch portion 3, in Step 15-2, the luminance enhancement quantity determined according to a light emission quantity (score) of a video signal by the luminance enhancement quantity determination portion 2 is used to stretch light source luminance of the backlight portion 5. Here, the backlight control portion 4 controls the backlight portion 5 in accordance with the luminance stretch quantity determined by the backlight luminance stretch portion 3.

The luminance stretching is performed, for example, in accordance with the prescribed characteristic of FIG. 5. In FIG. 5, a horizontal axis indicates a luminance enhancement quantity determined by the luminance enhancement quantity determination portion 2, and a vertical axis indicates a luminance level of the backlight, which is defined, for example, by driving duty, a driving current value or the like of the backlight.

For example, the maximum screen luminance in the case of normal lighting without stretching the backlight luminance is set to 450 cd/m$^2$. Here, when the light emission quantity is small and there is few area that emits light, the luminance enhancement quantity is at a minimum level and the light emission luminance level of the backlight is controlled at a point E1 of FIG. 5.

As the light emission quantity becomes higher from a state corresponding to the point E1, the luminance enhancement quantity also increases. In this case, the light emission luminance of the backlight is greatly stretched according to an increase in the luminance enhancement quantity as shown in FIG. 5. At a point E2 where the luminance enhancement quantity has a maximum value, the light emission luminance of the backlight is stretched so that the maximum screen luminance becomes 1500 cd/m$^2$, for example. Such control makes it possible to increase a feeling of brightness of a light-emitting part by stretching the light emission luminance of the backlight according to the light emission quantity detected from the input video signal.

(Luminance Stretch Processing of Video Signal 1)

Figure 6:
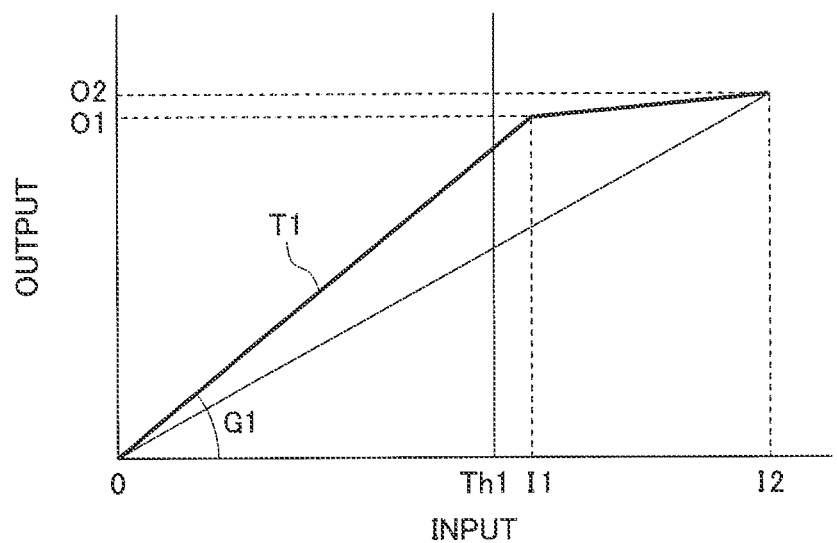
FIG. 6 is a diagram explaining luminance stretching of a video signal in a video signal luminance stretch portion, which is a diagram showing a setting example of input/output characteristic of the video signal.
Figure 16:
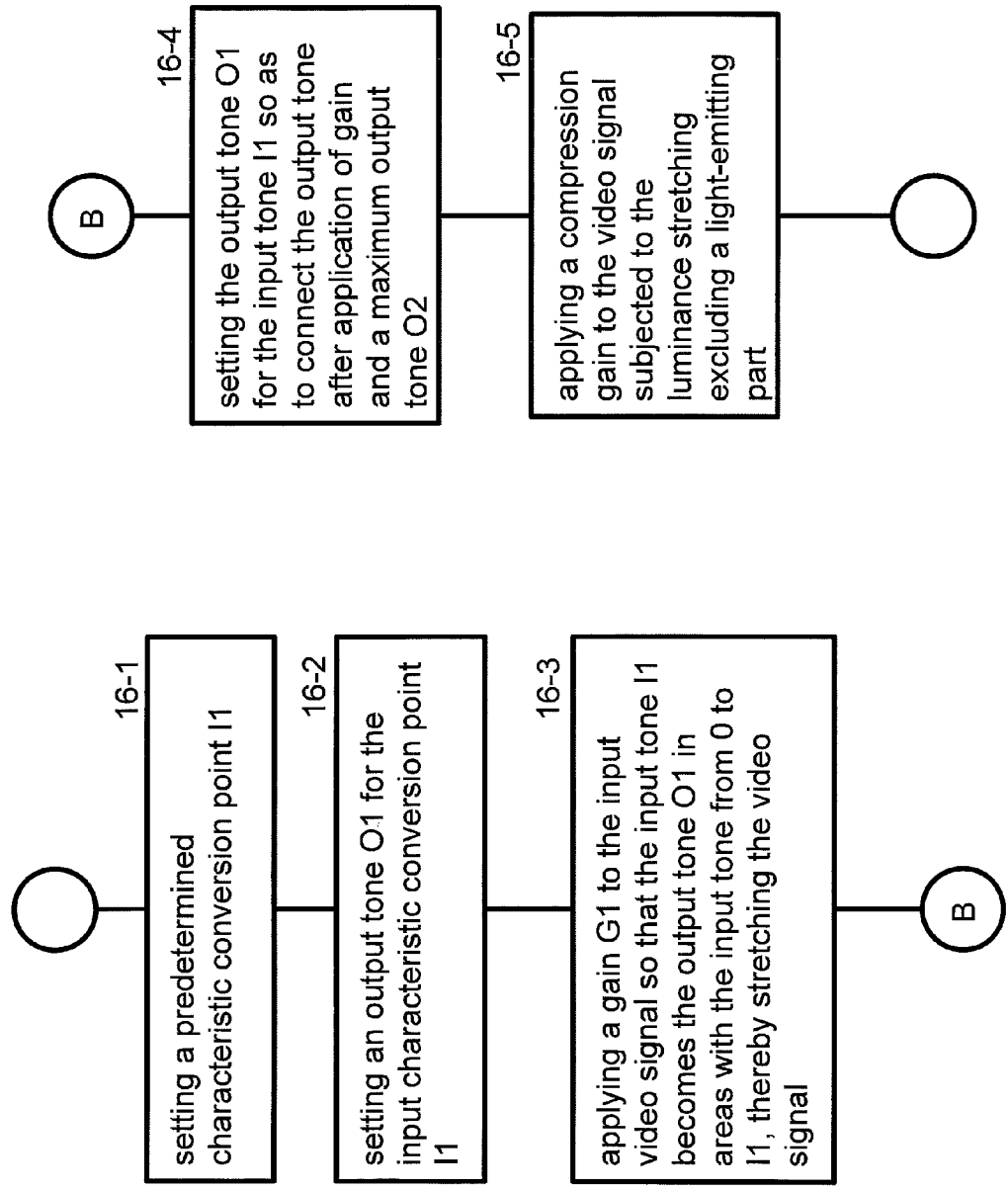
FIG. 16 is a flowchart explaining a first example of the luminance stretch processing of the input video signal according to the present invention.

Fig. 16 is a flowchart for a example of luminance stretch processing of the input video Signal. FIG. 6 is a diagram explaining luminance stretching of a video signal in the video signal luminance stretch portion, which is a diagram showing a setting example of input/output characteristic of the video signal.

As described above, in the light emission detection portion 1, a luminance (Y) histogram of an input video signal is generated to determine the second threshold Th2 for defining a light emitting boundary based on an average value and a standard deviation thereof. Pixels which are greater than or equal to the threshold Th2 in the Y histogram are regarded as light-emitting parts. In the video signal luminance stretch portion 6, video processing for stretching the video signal of the light-emitting part is performed.

At the time, input/output characteristic of the video signal is set as shown in FIG. 6 as an example. In FIG. 6, a horizontal axis indicates an input tone of the luminance Y of the video signal and a vertical axis indicates an output tone according to the input tone. Moreover, input/output characteristic of an RGB signal may be defined instead of the luminance Y. In the case of the RGB signal, a gain shown below is applied to each of the RGB signal to define input/output characteristic. The maximum value of the input/output tones has a tone level of 255 in the case of a video signal of 8-bit representation, for example. In FIG. 6, T1 indicates input/output characteristic after luminance stretch processing.

In setting of the input/output characteristic T1, first, in Step 16-1, a point I1 of the input tone is defined. The point I1 is set at a prescribed arbitrary position which is defined in advance. The prescribed position does not change dynamically according to the second threshold Th. Accordingly, when the position of the point I1 is on the lower-tone side than the second threshold Th2, the point I1 becomes the same value as that of the second threshold Th2. The point I1 corresponds to a characteristic conversion point of the present invention.

At the time, in Step 16-2, an output tone O1 for the input I1 is set to a prescribed value in advance. For example, it is set to a position to be 80% of a maximum value O2 of the output tone. Accordingly, in the input/output characteristic T1, in Step 16-3, a fixed gain G1 is applied to the input video signal for stretching so that the input tone of the point I1 becomes the output tone O1 in areas with the input tone from 0 to I1. The gain G1 is able to be expressed as an inclination of the input/output characteristic T1. The gain G1 is determined according to the position of I1 in which the output tone is determined.

Further, in Step 16-4, it is set so that a maximum output value O2 that has the same tone as the input tone is output in the case of a maximum input tone I2, and the output tone position corresponding to the point I1 and the output position tone position corresponding to the maximum input value I2 are connected linearly from the input tone I1 to the maximum tone I2. In the area from I1 to I2, increasing the output luminance gradually as the input tone becomes higher in a state where luminance stretching is performed sufficiently at I1 enables to prevent clipped whites after the luminance stretching as much as possible to express tones.

Thereby, the input/output characteristic T1 as shown in FIG. 6 is defined. With stretching of the video signal at the time, the luminance of the video signal of a light-emitting part is stretched, but a non-light-emitting part with a low tone is also stretched, so that tone mapping processing for reducing the luminance of the video signal of the non-light-emitting part again is performed in the mapping portion 7 at a subsequent stage.

(Luminance Stretch Processing of Video Signal 2)

Figure 7:
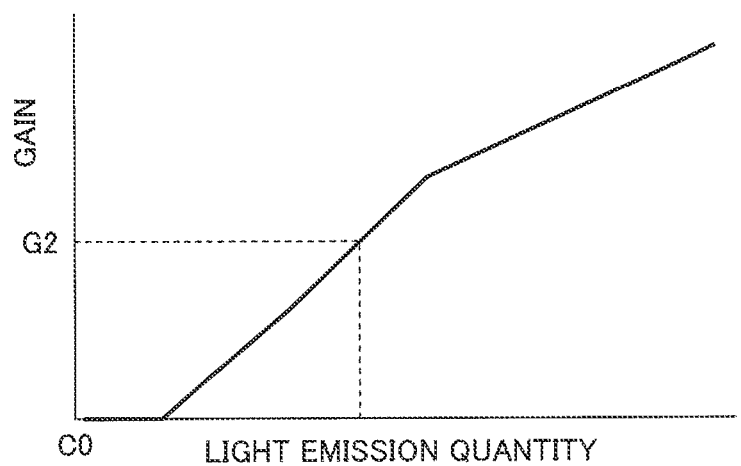
FIG. 7 is a diagram explaining another processing example of luminance stretching of a video signal in the video signal luminance stretch portion.

Fig. 17 is a flowchart for another example of luminance stretch processing of the input video signal. FIG. 7 is a diagram explaining another processing example of luminance stretching of a video signal in the video signal luminance stretch portion. In the processing example 1 shown in FIG. 6, the point I1 which is to have a prescribed output tone value is provided according to the Y histogram of the video signal, and a gain applied to the input video signal is set accordingly.

On the other hand, in the case of the present processing example, the gain for stretching the video signal is set based on a value of the light emission quantity (score) detected by the light emission detection portion 1 according to the Y histogram or Max RGB Ave.

As shown in FIG. 7, the video signal luminance stretch portion 6 defines a relationship between the light emission quantity and the gain in advance. This relationship is provided in Step 17-1. Further, an LUT which defines the relationship therebetween is created to determine the gain according to the light emission quantity with this LUT. Here, basically, as the light emission quantity becomes higher, the gain for stretching the video signal is increased. Moreover, it is possible to set so as not to increase the gain in a prescribed area with a small light emission quantity. This is because there is less light-emitting part when the light emission quantity is small and little effect is given even when luminance stretching of the video signal is performed.

Figure 8:
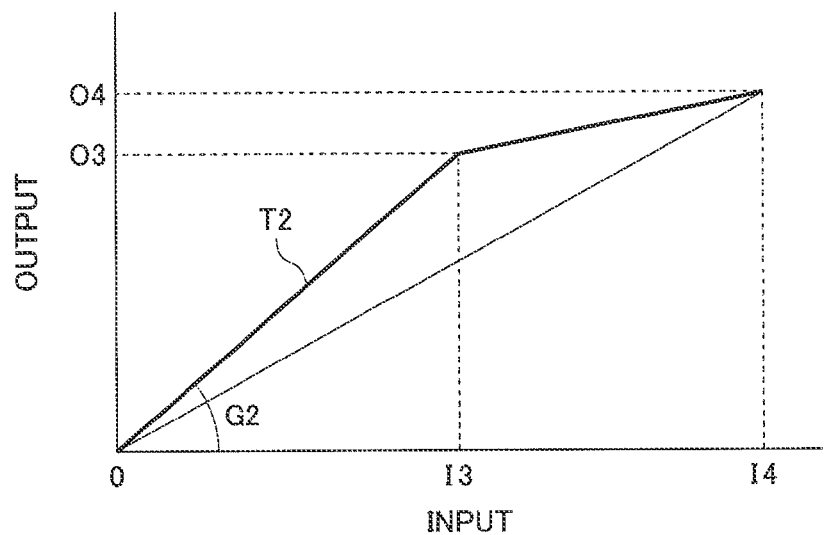
FIG. 8 is a diagram showing a setting example of input/output characteristic in the case of stretching with a gain applied to an input video signal.

FIG. 8 is a diagram showing a setting example of input/output characteristic in the case of stretching with a gain applied to an input video signal. In Step 17-2, the video signal luminance stretch portion 6 determines a gain from a light emission quantity based on the relationship shown in FIG. 7 to apply to a video signal. For example, with the relationship of FIG. 7, a gain G2 is to be determined.

In this case, as shown in FIG. 8, the above-described gain G2 which is determined is applied, in Step 17-3, to the input video signal in a range where an input tone is from minimum (0) to a prescribed tone I3. The gain G2 is expressed as an inclination quantity of input/output characteristic T2 after the gain is applied.

The prescribed tone I3 is able to be set arbitrarily. For example, the output tone O3 corresponding to the input tone I3 is set to a tone to be 80% of a maximum tone O4. Further, I3 is given as the input tone when the gain G2 is applied to the video signal and the output tone reaches 80% of the maximum tone. In Step 17-4, the output tone position of I3 and the output tone position of the maximum tone I4 are connected linearly when the input tone is between I3 and the maximum tone I4. Thereby, the input/output characteristic T2 as shown in FIG. 8 is defined. I3 corresponds to a characteristic conversion point of the present invention.

With stretching of the video signal at the time, the luminance of the video signal of a light-emitting part is stretched, but a non-light-emitting part is also stretched, so that video processing for reducing the luminance of the video signal of the non-light-emitting part again is performed in the mapping portion 7 at a subsequent stage.

(Mapping Processing 1)

As described above, in the backlight luminance stretch portion 3, the stretch quantity to stretch the luminance of the backlight portion 5 is determined in accordance with the luminance enhancement quantity determined according to the light emission quantity. Moreover, in the video signal luminance stretch portion 6, the video signal is stretched based on a state of distribution of the Y histogram or the detected light emission quantity. Accordingly, if nothing is done, the luminance increases in all tone areas of the input video signal, and so-called black floating easily occurs so that quality is decreased as well as a contrast feeling lacks.

In the mapping portion 7, the luminance of a non-light-emitting part is reduced by video signal processing. Thereby, the luminance of a light-emitting part of the input video signal is stretched so that the luminance of the non-light-emitting part is not changed to give a contrast feeling and emphasize a feeling of brightness of the light-emitting part.

Figure 9:
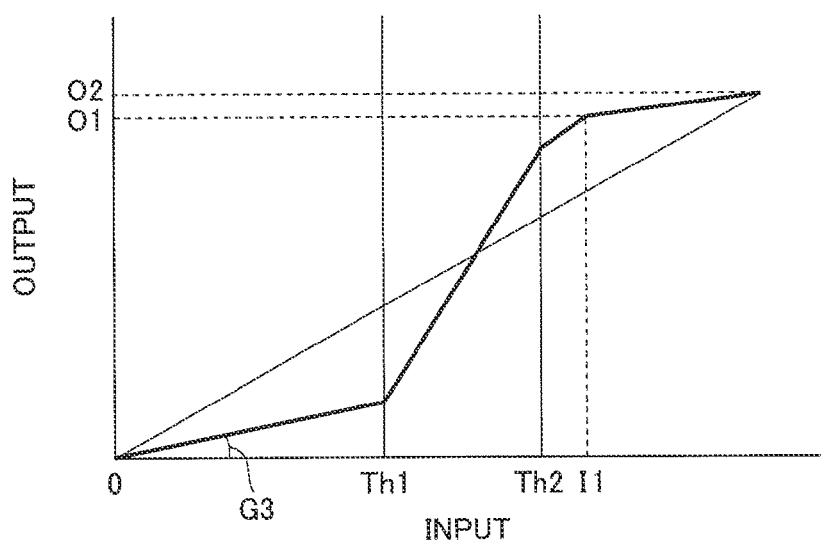
FIG. 9 is a diagram showing an example of tone mapping generated by a mapping portion.

FIG. 9 is a diagram showing an example of tone mapping generated by the mapping portion 7, which is a diagram showing an example of tone mapping when a video signal is stretched in accordance with the position of I1 set to the Y histogram of the video signal by the luminance stretch processing 1 shown in FIG. 6. In FIG. 9, a horizontal axis indicates an input tone of the video signal and a vertical axis indicates an output tone. The input/output tones are able to be luminance Y of the video signal or tones of RGB. In the case of the RGB signal, a gain shown below is applied to each of the RGB signal to define input/output characteristic.

An area which is greater than or equal to the second threshold Th2 that is detected by the light emission detection portion 1 is a part that is regarded as emitting light in the video. In the mapping portion 7, in Step 16-5 (17-5), a compression gain is applied to the video signal subjected to luminance stretching in the video signal luminance stretch portion 6 excluding a light-emitting part to perform mapping of characteristic subjected to gain-down.

At the time, when a fixed compression gain is uniformly applied to an area which has a lower tone than Th2 serving as a light emitting boundary to suppress the output tone, there is sense of incongruity arising in tones. Therefore, the first threshold Th1 is set and a gain G3 is set for an area which has a lower tone than Th1 is set to perform tone mapping so as to linearly connect between Th1 and Th2.

The gain G3 is for compensating for and reducing the luminance corresponding to both of the luminance stretch quantity by the backlight luminance stretch portion 3 and the luminance stretch quantity by the video signal luminance stretch portion 6, and is set to a value that maintains the tone of the input video signal on a screen.

Here, it is set that the backlight luminance is subjected to luminance stretching by b-times. A reference of b-times is the backlight luminance of the point E1 of FIG. 5, and shows by how many times of the luminance at the time the luminance stretching is performed. In this case, when reducing and compensating for the b-times backlight luminance stretch quantity by video signal processing, a required reduction amount becomes $(1/b)^{\gamma}$-times.

Moreover, it is set that the luminance stretch quantity by the gain G1 in the video signal luminance stretch portion 6 is a-times. A reference of a-times is input/output characteristic in the case of gain=1 (input tone=output tone). In this case, the luminance reduction amount by video processing of the mapping portion 7 becomes 1/a-times. Accordingly, the gain G3 which is applied to an area smaller than the first threshold Th1 is set by $(1/b)^{\gamma} \times (1/a)$. Thereby, the screen luminance according to the tone of the input video signal is maintained in a range of the lower tone than the first threshold Th1 among a non-light-emitting part of the input video signal.

In the tone mapping with the second threshold Th2 or more, the input/output characteristic stretched in the video signal luminance stretch portion 6 is used as it is. A characteristic conversion point (knee point) of the input/output characteristic in the input tone I1 set to the second threshold Th2 or more is also maintained as it is. Thereby, in an area of a light emitting color with the second threshold Th2 or more, a light image with a feeling of brightness is obtained by stretching of the video signal and luminance stretching of the backlight.

Further, it is set so that the output tone of the first threshold Th1 reduced by the gain G3 and the output tone of the second threshold Th2 are connected with a straight line from the first threshold Th1 to the second threshold Th2. By the above-described processing, tone mapping as shown in FIG. 9 is obtained. At the time, for a connecting part of Th1 and Th2 and the characteristic conversion point of the input tone I1, a predetermined range (for example, connecting part±Δ (Δ is a prescribed value)) may be subjected to smoothing by a quadratic function.

(Mapping Processing 2)

Figure 10:
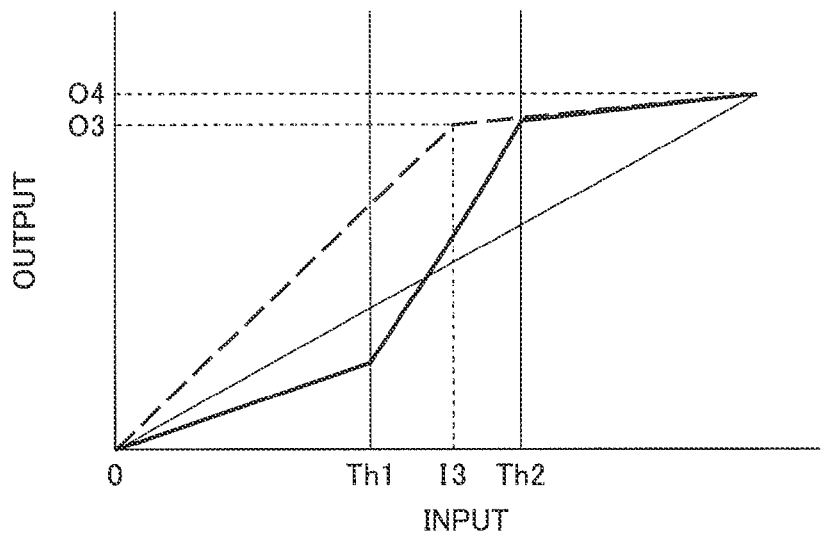
FIG. 10 is a diagram showing another example of tone matting generated by the mapping portion.

FIG. 10 is a diagram showing another example of tone mapping generated by the mapping portion 7, which is a diagram showing a tone mapping example when a video signal is stretched in accordance with a gain set from a light emission quantity of the video signal by the video signal luminance stretch processing shown in FIG. 8. In FIG. 10, a horizontal axis indicates an input tone of the video signal and a vertical axis indicates an output tone. The input/output tones are able to be luminance Y of the video signal or tones of RGB. In the case of the RGB signal, a gain shown below is applied to each of the RGB signal to define input/output characteristic.

In the present example as well, similarly to the first processing example of FIG. 10, a compression gain is applied to the video signal subjected to luminance stretching in the video signal luminance stretch portion 6 excluding a light-emitting part to apply gain-down. In this case, similarly to the example of FIG. 9, the first threshold Th1 is set and the gain G3 is set for an area smaller than Th1 is set to perform tone mapping so as to linearly connect between Th1 and Th2.

The gain G3 is for reducing the luminance corresponding to both of the luminance stretch quantity by the backlight luminance stretch portion 3 and the luminance stretch quantity by the video signal luminance stretch portion 6, and when the backlight luminance is subjected to luminance stretching by b-times and the luminance stretch quantity by the gain G2 in the video signal luminance stretch portion 6 is a-times, the gain G3 which is applied to the area smaller than the first threshold Th1 becomes $(1/b)^\gamma \times (1/a)$. Thereby, the screen luminance according to the tone of the input video signal is maintained in an area with the lower tone than the first threshold Th1 among a non-light-emitting part of the input video signal.

Moreover, in the tone mapping with the second threshold Th2 or more, the input/output characteristic stretched in the video signal luminance stretch portion 6 is used as it is. Thereby, in an area of a light emitting color with the second threshold Th2 or more, a light image with a feeling of brightness is obtained by stretching of the video signal and luminance stretching of the backlight.

Further, it is set so that the output tone of the first threshold Th1 reduced by the gain G3 and the output tone of the second threshold Th2 are connected with a straight line from the first threshold Th1 to the second threshold Th2. By the above-described processing, tone mapping as shown in FIG. 10 is obtained. A characteristic conversion point (knee point) of the input tone I3 set in the video signal luminance stretch portion 6 is not maintained in the case of being smaller than the second threshold Th2 and taken into by the line connecting the output tones of the first threshold Th1 and the second threshold Th2. Accordingly, a new characteristic conversion point is set to the output tone part of the second threshold Th2. At the time, for a connecting part of Th1 and Th2, a predetermined range (for example, connecting part±Δ (Δ is a prescribed value)) may be subjected to smoothing by a quadratic function.

Figure 11:
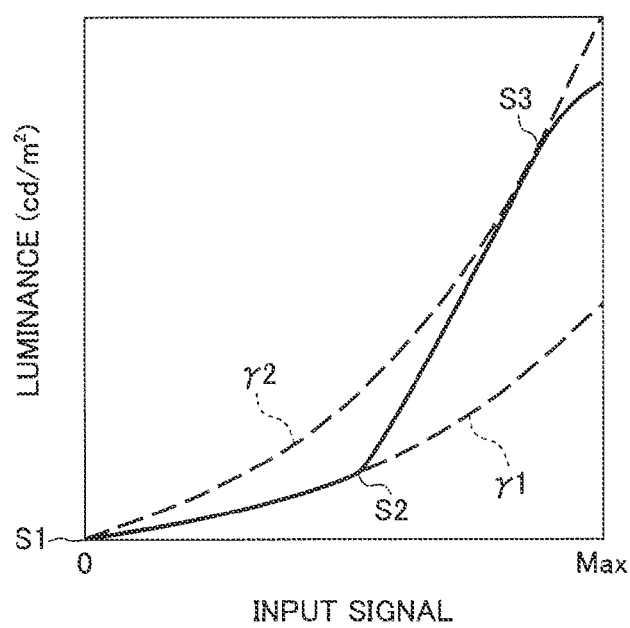
FIG. 11 is a diagram showing an example of a state where screen luminance is stretched.

FIG. 11 is a diagram showing an example of a state where screen luminance is stretched. A horizontal axis indicates a tone value of an input video signal and a vertical axis indicates screen luminance ($cd/m^2$) of the display portion 9.

S1, S2 and S3 correspond to a tone value of a minimum tone, a tone value of the first threshold Th1, and a tone value of the second threshold Th2, respectively. In the case of the input tone values from S1 to S2, tone mapping of the video signal is performed so as to reduce amount for the screen luminance increased by the luminance stretching of the backlight and the stretching of the video signal as described above. Therefore, a screen is displayed with a first γ curve (γ1) from S1 to S2. The first γ curve (γ1) is such standard luminance that the screen luminance becomes 450 $cd/m^2$ in the case of the maximum tone value.

In the case of a dark video with a low tone, displaying with increased luminance causes reduction of the contrast and deterioration of the quality such as black floating, and the screen luminance is thus not increased by suppressing the luminance only by amount of luminance stretching of the backlight and amount of luminance stretching of the video signal by video signal processing. Note that, the γ curve from S1 to S2 does not need to conform to the above-described standard first γ curve (γ1), and is able to be set by appropriately adjusting the gain G3, as long as having a level allowing a difference from a stretch area of a light-emitting part.

Moreover, from S2 to S3, according to tone mapping of Th1 to Th2, the screen luminance increases being away from the first γ curve (γ1) with the increase in the input tone, and increases up to a level of a second γ curve (γ2) near S3 corresponding to the second threshold Th2. Thereafter, an increasing rate of the screen luminance decreases (inclination becomes gradual) and the input tone reaches maximum. The second γ curve (γ2) shows the screen luminance with the γ curve when the video signal is stretched with the gain G1 of FIG. 6 or the gain G2 of FIG. 8. Moreover, by decreasing the increasing rate of the screen luminance in a higher tone area than S3, deformation in the high tone area by the luminance stretching is prevented to maintain tone representation as much as possible. In this manner, it is possible to express a high-quality video having a feeling of brightness and a contrast feeling in the high tone area.

Figure 12:
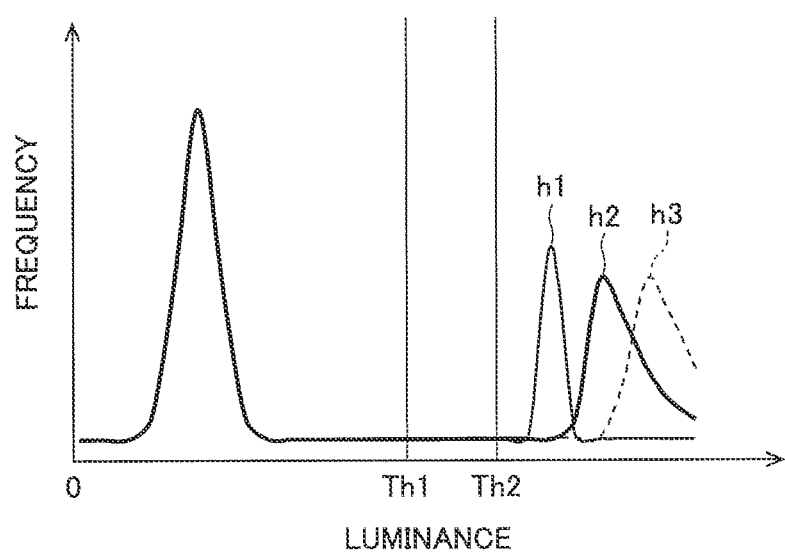
FIG. 12 is a diagram explaining the effect of luminance stretch processing according to the present invention.
Figure 13:
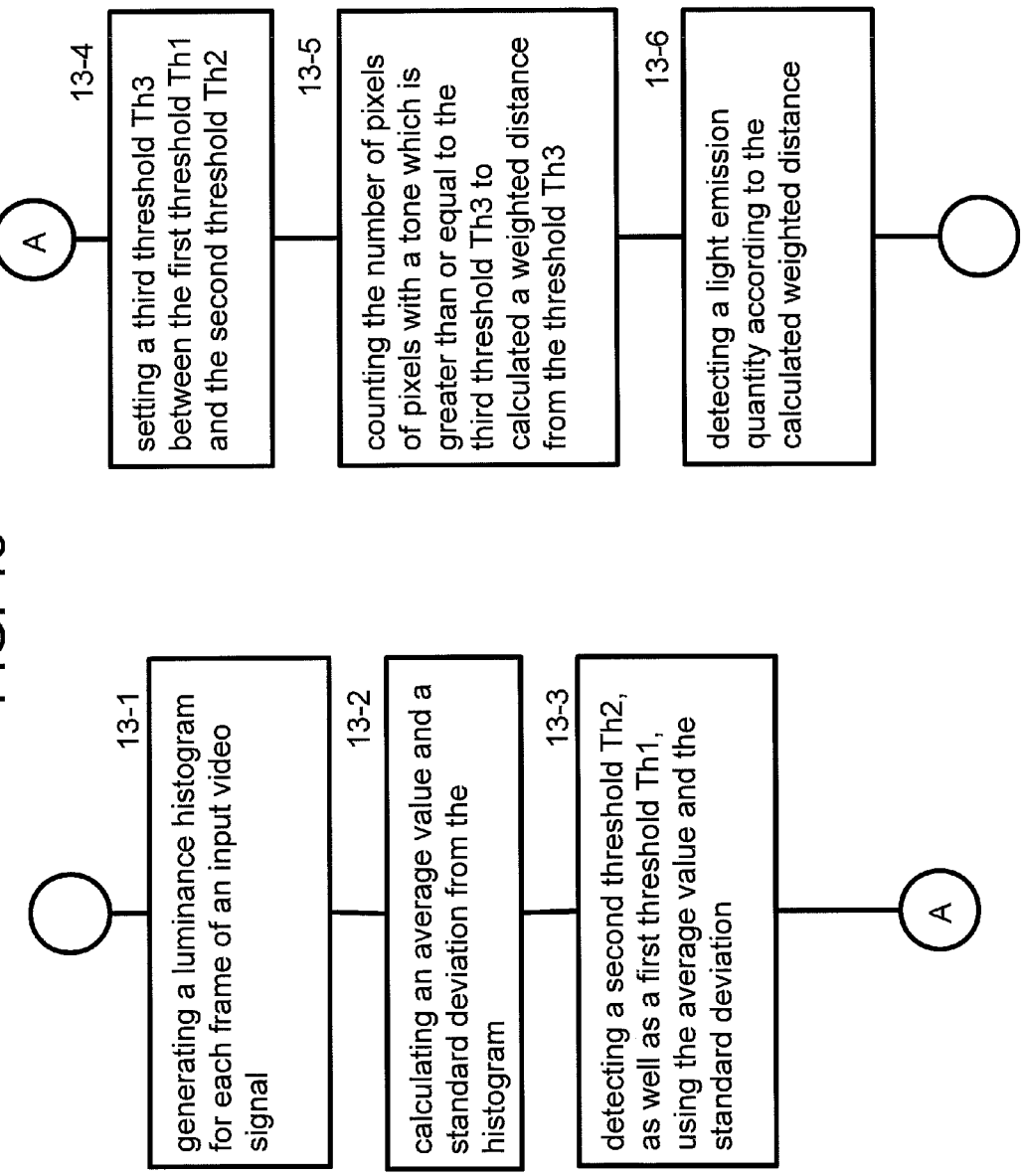
FIG. 13 is a flowchart explaining a first example of the light emission detection processing according to the present invention.
Figure 14:
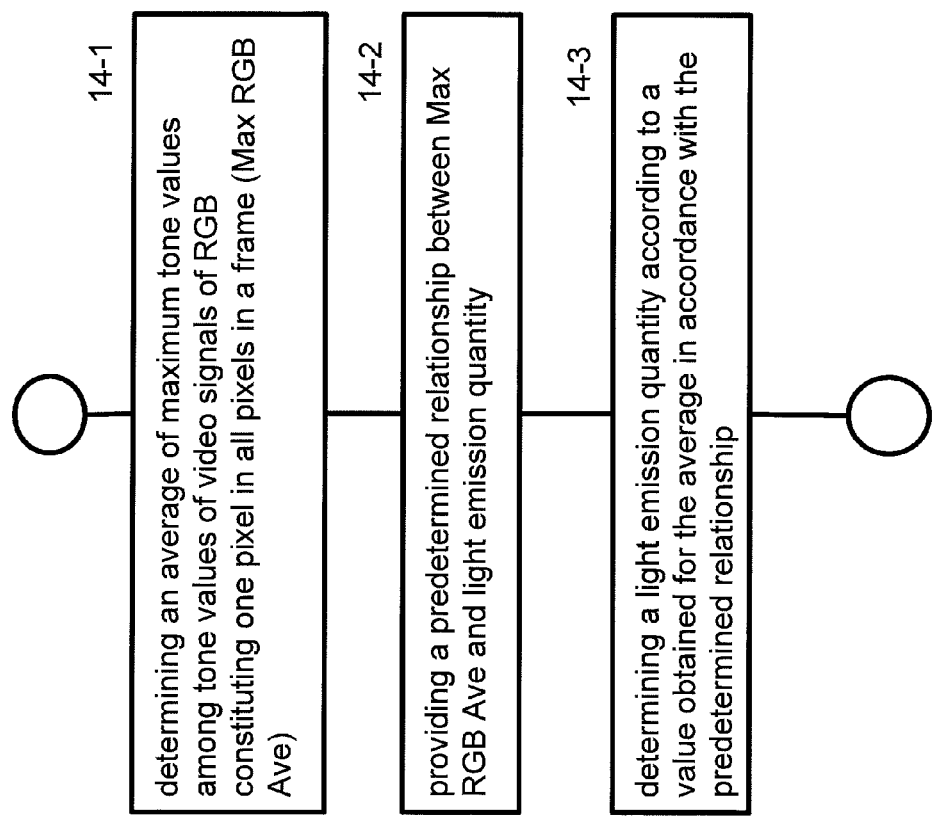
FIG. 14 is a flowchart explaining another example of the light emission detection processing according to the present invention.
Figure 15:
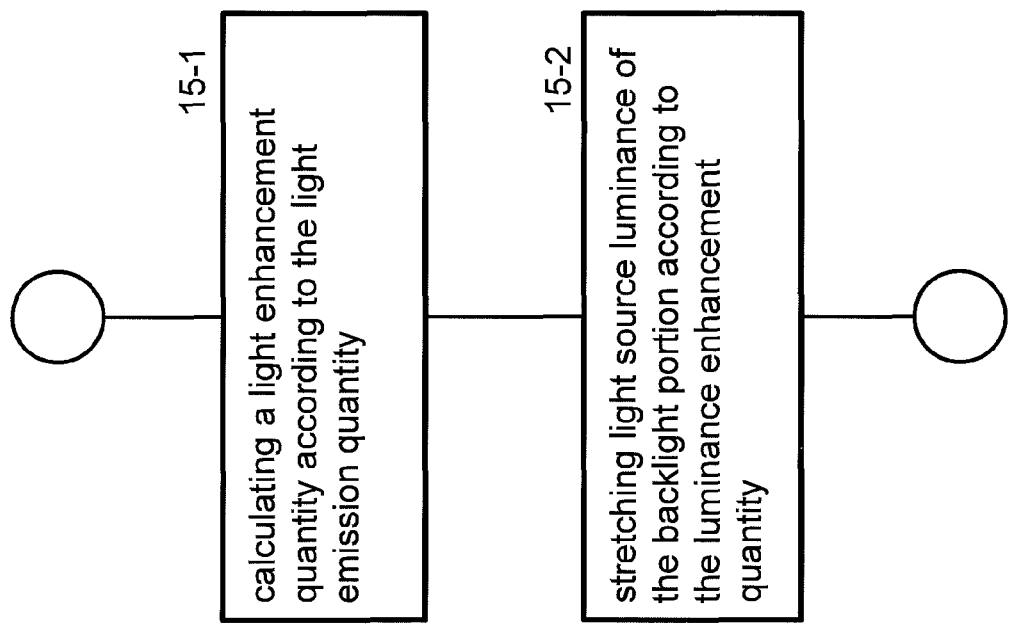
FIG. 15 is a flowchart explaining an example of the luminance stretch processing of the backlight according to the present invention.

FIG. 12 is a diagram explaining the effect of luminance stretch processing according to the present invention, which is a diagram showing an example of a state of a luminance histogram before and after luminance stretch processing. In FIG. 12, h1 indicates a luminance histogram obtained from an input video signal before luminance stretch processing is performed, h2 indicates a luminance histogram when tone mapping is performed for the luminance histogram h1 by the above-described luminance stretching 1 and mapping processing 1, and h3 indicates a luminance histogram when tone mapping is performed for the luminance histogram h1 by the above-described luminance stretching 2 and mapping processing 2.

In this example, in the luminance histogram h1 of the input video signal, a lot of pixels exist in a low tone area smaller than the first threshold Th1 and significant pixels exist also in a high tone area greater than the second threshold Th2. That is, an image is such that a light part that is regarded as emitting light exists in a relatively dark screen.

In the luminance stretching 1 and the mapping processing 1, the second threshold Th2 is set from a luminance histogram of an input video signal and a gain is increased for an area from the minimum tone to the point I1 which is greater than or equal to Th2 to reduce the luminance of the lower tone area than the first threshold Th1 that is a non-light-emitting part by mapping processing. In the luminance histogram h2 obtained by this processing, the non-light-emitting part with low luminance is not subjected to luminance stretching so that the tone of the input video signal is maintained. Moreover, a pixel group that emits light on the higher tone side than a light emitting boundary of Th2 shifts to the further higher tone side by luminance stretching. That is, only the light-emitting part is subjected to luminance stretching to increase a contrast feeling and a feeling of brightness.

In the luminance stretching 2 and the mapping processing 2, a gain is determined based on a light emission quantity detected from an input video signal, the determined gain is applied to a low tone area for increasing the gain, and the luminance of a lower tone area than the first threshold Th1 that is a non-light-emitting part is reduced by the mapping processing.

In the luminance histogram h3 obtained by this processing, similarly to the histogram h2, the non-light-emitting part with low luminance is not subjected to luminance stretching so that the tone of the input video signal is maintained, however, the pixel group that is regarded as emitting light on the high tone side shifts to the further higher tone side than the histogram Th2. Through the luminance stretching is performed with the threshold (second threshold Th2) that is set based on a distribution state of the luminance histogram (Ave., $\sigma$) in the luminance stretching 1 and the mapping processing 1, the number of pixels of the light-emitting part is weighted for integration, and based on which, the luminance stretching is performed in the luminance stretching 2 and the mapping processing 2. Accordingly, in the case of a video that has a lot of pixel groups in a high tone area and the like, the luminance stretch quantity becomes large, a feeling of brightness is further increased than the case of the histogram Th2, and a contrast feeling is improved.

The above-described examples show an example of a state of a video when excellent effect is obtained, and even in any case of the processing, it becomes possible to express a high-quality video by improving a contrast feeling and increasing a feeling of brightness of a light part with luminance stretching of the backlight, luminance stretching and tone mapping of the video.

EXPLANATIONS OF LETTERS OR NUMERALS

1 . . . light emission detection portion, 2 . . . luminance enhancement quantity determination portion, 3 . . . backlight luminance stretch portion, 4 . . . backlight control portion, 5 . . . backlight portion, 6 . . . video signal luminance stretch portion, 7 . . . mapping portion, 8 . . . display control portion, and 9 . . . display portion.

The invention claimed is:

1. A video display device comprising: a display portion for displaying an input video signal; a light source for illuminating the display portion; and a control portion for controlling the display portion and the light source, wherein
the control portion detects a light-emitting part of the input video signal based on a luminance value of the input video signal or other feature quantity, and stretches a video signal of the light-emitting part to display on the display portion,
the control portion detects a light-emitting part which is predetermined according to a histogram, based on a luminance histogram for each frame of the input video signal, and as to the input video signal of a prescribed range including the detected light-emitting part, detects a predetermined light emission quantity according to a score obtained by counting the number of pixels with a weight given to luminance for each pixel to stretch the luminance of the light source according to the detected light emission quantity,
the control portion regards a pixel which is greater than or equal to:

$$\text{thresh} = A + N\sigma \text{ (N is a constant)}$$

as the light-emitting part, where an average value of the luminance histogram is A and a standard deviation is $\sigma$.

2. A television receiving device including the video display device as defined in claim 1.

3. A video display device comprising: a display portion for displaying an input video signal; a light source for illuminating the display portion; and a control portion for controlling the display portion and the light source, wherein
the control portion detects a light-emitting part of the input video signal based on a maximum value of tone values of RGB for each pixel of the input video signal or other feature quantity, and stretches a video signal of the light-emitting part to display on the display portion, and
the control portion detects a predetermined light emission quantity according to a value obtained by averaging the maximum values of tone values of the RGB of the input video signal and stretches the luminance of the light source according to the detected light emission quantity.

4. A video display device comprising: a display portion for displaying an input video signal; a light source for illuminating the display portion; and a control portion for controlling the display portion and the light source, wherein
the control portion detects a light-emitting part which is predetermined according to a histogram, based on a luminance histogram for each frame of the input video signal, and as to the input video signal of a prescribed range including the detected light-emitting part, detects a predetermined light emission quantity according to a score obtained by counting the number of pixels with a weight given to luminance for each pixel to stretch luminance of the light source according to the detected light emission quantity,
the control portion performs video processing for converting and outputting an input tone of the input video signal, and
the video processing includes processing for, based on the luminance histogram for each frame of the input video signal, detecting the predetermined light-emitting part according to the histogram, setting a prescribed characteristic conversion point in an area of the detected light-emitting part, applying a gain to a video signal with a lower tone than the characteristic conversion point so that the input tone of the input video signal at the characteristic conversion point is stretched up to a prescribed output tone to display on the display portion, and in the input tone which is greater than or equal to the characteristic conversion point, setting the output tone for the input tone so as to connect the output tone after application of gain at the characteristic conversion point and a maximum output tone.

5. The video display device as defined in claim 4, wherein the video processing includes processing for reducing the output tone by applying a compression gain in a prescribed area of a non-light-emitting part excluding the light-emitting part after applying a prescribed gain to the input video signal to stretch the video signal.

6. The video display device as defined in claim 5, wherein the compression gain is a value for reducing display luminance which is increased by stretching of the luminance of the light source and stretching of the video signal by application of the gain in the prescribed area of the non-light-emitting part.

7. A video display device comprising: a display portion for displaying an input video signal; a light source for illuminating the display portion; and a control portion for controlling the display portion and the light source, wherein
- the control portion detects a light-emitting part which is predetermined according to a histogram, based on a luminance histogram for each frame of the input video signal, and as to the input video signal of a prescribed range including the detected light-emitting part, detects a predetermined light emission quantity according to a score obtained by counting the number of pixels with a weight given to luminance for each pixel to stretch luminance of the light source according to the detected light emission quantity,
- the control portion performs video processing for converting and outputting an input tone of the input video signal, and
- the video processing includes processing for defining a relationship between a gain applied to a video signal and the light emission quantity in advance, determining the gain according to the light emission quantity detected from the input video signal, applying the determined gain to the input video signal for stretching, using an input tone at a point where an output tone after the application of gain is stretched up to a prescribed output tone as a characteristic conversion point, outputting the video signal with the output tone to which the gain is applied in a lower tone than the characteristic conversion point, and in the input tone which is greater than or equal to the characteristic conversion point, setting the output tone for the input tone so as to connect the output tone after application of gain at the characteristic conversion point and a maximum output tone.

\* \* \* \* \*